UNITED STATES PATENT OFFICE.

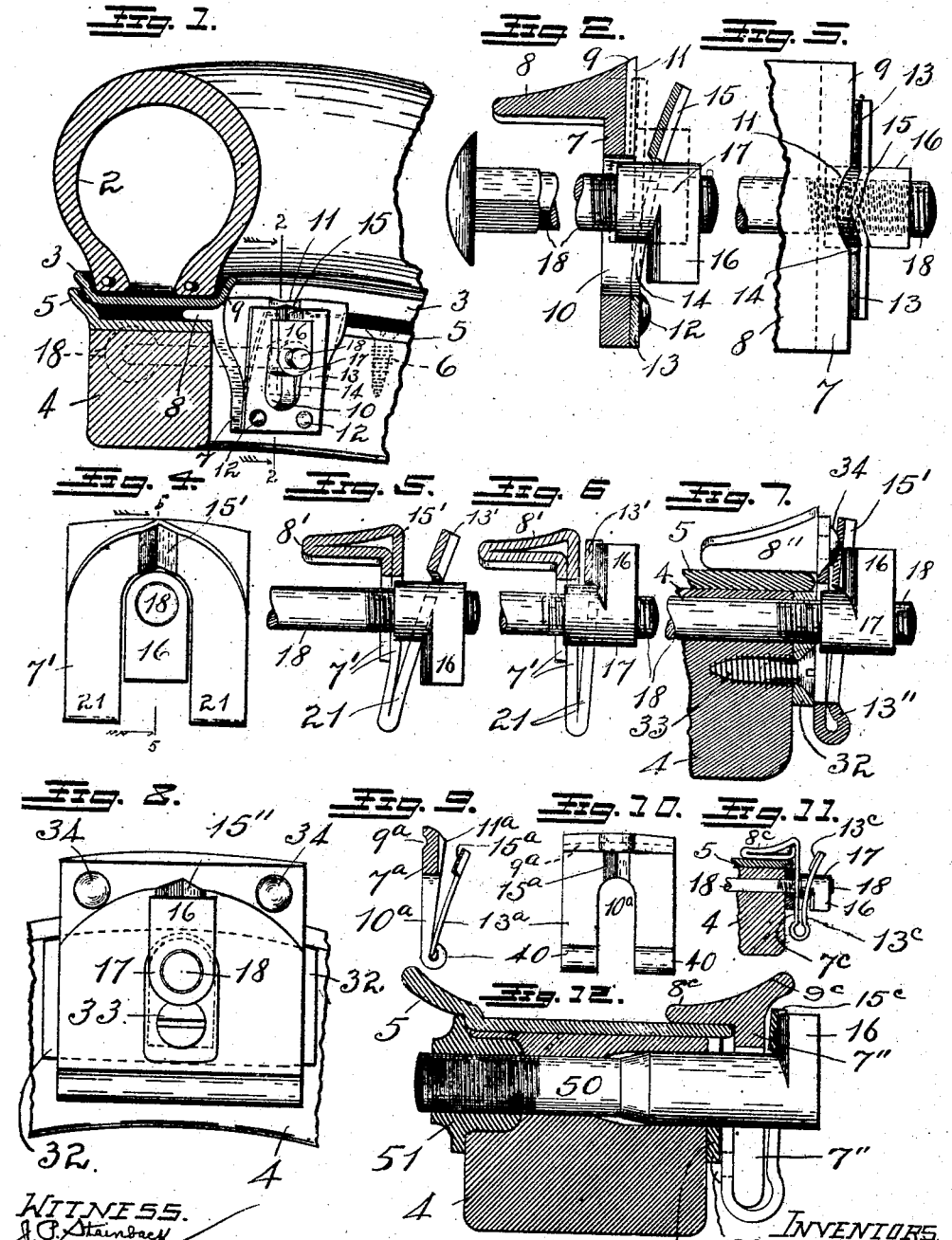

GEORGE G. BAYNE AND ALFRED WM. KNUTSON, OF QUINCY, ILLINOIS; SAID KNUTSON ASSIGNOR TO SAID BAYNE.

MEANS FOR LOCKING DEMOUNTABLE TIRE-RIMS.

1,189,421.  Specification of Letters Patent.  Patented July 4, 1916.

Application filed September 25, 1915. Serial No. 52,725.

*To all whom it may concern:*

Be it known that we, GEORGE G. BAYNE and ALFRED W. KNUTSON, citizens of the United States, whose post-office addresses are both Quincy, in the county of Adams and State of Illinois, have jointly invented a new and useful Means for Locking Demountable Tire-Rims, of which the following is a specification.

Our invention relates to devices for securing demountable rims to vehicle wheels.

The principal object of the invention is to provide means which are almost instantly attachable to or detachable from a permanent rim and the felly whereby to permit the detachable rim and thereby the tire to be removed from or replaced on the permanent rim in an extremely quick period of time.

A further object is to provide a device which, when once positioned, cannot be removed except in the manner intended for its removal.

Another object is to provide a device which will not readily be affected by moisture, mud, sand, grit nor any other of the injurious things to which tires are subjected.

Another object is to generally simplify and improve the construction and to increase the utility and efficiency of devices of this character.

To the attainment of the foregoing and other ends, the invention relates to improvements in the structure, to certain novel combinations, and to the adaptation of parts hereinafter described and claimed.

In carrying out the objects of the invention generally stated above, it will be understood, of course, that the essential features of the same are susceptible of numerous changes in details, structure and structural arrangements, certain practical embodiments of which are shown in the accompanying drawings, wherein:

Figure 1 is a perspective of a preferred form of my improvements as in position on a fragment of an automobile wheel. Fig. 2, an enlarged edge elevation, partly in section in the line 2—2 in Fig. 1 and partly broken away, of the device shown in Fig. 1. Fig. 3, a top plan, partly broken away, of the structure shown in Figs. 1 and 2. Fig. 4, a front elevation of a modified form of device. Figs. 5 and 6, edge elevations partly in section in the line 5—5 in Fig. 4 in unlocked and locked positions respectively, of the structure shown in Fig. 4. Fig. 7, an edge elevation, partly in section, of another modification. Fig. 8, a face or front elevation, of the structure disclosed in Fig. 7. Fig. 9, an edge elevation, partly in section, of another modification. Fig. 10, a face or front elevation of the device shown in Fig. 9. Fig. 11, still another modification, it being an edge view, partly broken away and partly in section; and Fig. 12, still another modification, partly in elevation and partly in section.

In the different views like parts are designated by the same, and similar parts by similar reference characters.

2 designates a pneumatic tire seated in a demountable rim 3. 4 designates a felly and 5 a permanent rim secured to the felly in any of the well known manners, as by screws 6. These elements are of well known construction and old in the art.

7 designates a plate or base having a rectangularly arranged rim-supporting extension 8, a rim-binding extension 9, an oblong approximately central opening 10, and at its upper central portion a pocket or recess 11. Secured by rivets 12 or in any other suitable manner to the base 7 is a plate-spring 13 having a slot 14 registering with the slot 10 and provided also with a concavo-convex recess or pocket 15, the convex portion of which is adapted to be received in the pocket 11 and the concavity of which is adapted to receive the slightly beveled face (which may be omitted) of the rectangularly arranged head 16 of a nut 17.

18 designates a bolt which passes through the felly and thence through the slots 10 and 14, where it is engaged by the threads in the nut 17.

For the purposes of this specification the elements and parts 7, 8 12 and 13 may be termed a spring clip.

In Figs. 1 and 2 the manner of operation is shown, which may be described as follows: Assume the parts to have been placed in the relative positions shown by dotted lines in Fig. 1 and by full lines in Fig. 2. To lock the demountable rim 3 and thereby the tire 2 on the fixed or permanent rim 5 the nut 17 is to be given a one-half revolution in the direction to thread it onto the bolt 18. The head 16 will cam over the outstanding spring 13, forcing the free end of the latter inwardly, until the head 16 strikes and drops into the recess or pocket 15, thus forcing the convex portion thereof into the pocket 11, whereupon said spring will instantly expand and bear against the head of the nut, thereby tending to draw it away from the head of the bolt 18, which head, bearing against the felly, will be drawn more tightly thereagainst and the plate 7 be forced toward the rims and felly to lock the detachable rim 3 rigidly between the clip-projection 9 and the flaring arm of the fixed rim 5, with the detachable rim resting firmly and evenly on the inner edge of said arm and on the rim supporting flange or projection 8 of the clip. The nut cannot move after this operation, for the expanded spring is bearing firmly against it and a portion of the head of the latter is resting in and locked from rotation by the recess 15.

To remove the tire from the position just described the nut 17 is to be given a one-half turn in the opposite direction in order to bring its head 16 into registration with the slots 10 and 14, whereupon the clip may be pulled or pried free and removed.

Referring now to Figs. 4, 5 and 6, in which the bolt and nut are identical with those shown in the principal figures and therefore likewise numbered, the clip is formed of a single piece of spring metal consisting of a base 7' comprising one end and an intermediate portion of a plate, folded at its lower end to form a pair of ears 21 which are united at their upper ends in a V-shaped pocket 15', the back plate of the base being bent to form a rim-supporting flange 8' and being slotted similarly to the front piece of the base 7'.

In the modification shown in Figs. 7 and 8, the spring 13'' is substantially V-shaped, its branches or leaves slotted for the passage of the bolt-head 16 and the front one having a pocket 15'' for the engagement of said head. 32 indicates a plate fixed by a screw 33 to the felly 4. 8'' designates a casting secured by rivets 34 to the inner leaf of the spring and serving the same purposes as does the flange or projection 8 of Fig. 1.

Now see Figs. 9 and 10. 7ª designates a base having a transversely arranged rim-edge-receiving recess 9ª, a spring-projection receiving pocket 11ª, a nut-head-passage slot 10ª, and a curled bottom 40 adapted to receive and be bent or driven down onto, to fasten therein the lower end of a spring 13ª having a projection 15ª.

In Fig. 11 the clip is shown as formed of a single piece of metal having a base 7ᶜ, a rim-supporting flange 8ᶜ, and a spring 13ᶜ provided with a pocket projection 15ᶜ. It is provided also with slots for the passage of the bolt-head 16.

In Fig. 12 I have shown the head 16 as on the bolt instead of on the nut as in all the other figures. 50 designates the bolt, and 51 the nut. 52 indicates a V-shaped or apertured plate provided for the same purpose as is the plate 32 shown in Fig. 8, namely, to furnish a metal base for the bolt. 7'' designates a base very similar to that shown in Figs. 1, 2 and 3 and has a rim-supporting flange 8ᵉ and a rim-binding flange 9ᵉ. The spring is substantially V-shaped and is secured by rivets 12ᵉ to the base 7ᵉ. 15ᵉ designates the pocket in said spring, adapted to be engaged by the head 16 of the bolt 50.

Having thus described our invention we claim as new the following, namely:

1. The combination with a wheel felly and a detachable rim, of a bolt engaging the felly, a nut engaging the bolt, and a substantially V-shaped spring clip each limb of which has an elongated opening, said clip striding the bolt and the head of said nut adapted in rotating to depress one of the limbs of said clip and said clip to bear against said nut to lock said rim, and the nut to be turned to another position to permit said opening to pass over the bolt whereby to unlock said rim.

2. In combination, a wheel including a felly, a rim fixed thereon, and a rim removable from said rim, a bolt passed through said felly, a nut engaging it, and a substantially V-shaped spring clip having registering apertures in its limbs, the head of said bolt adapted to compress one limb of said clip and the clip to then expand and bear against said nut.

3. The combination with a wheel-felly and a detachable rim, of a bolt engaging the felly, a nut engaging the bolt, and a spring-clip having an elongated opening, said clip striding the bolt and the head of said nut adapted in rotating to depress a portion of the clip to bear against the nut to lock the rim, and the nut to be turned to another position to permit said opening to be passed over the head thereof whereby to unlock the rim.

4. In combination, a wheel including a felly, a rim fixed thereon, a rim removable from said rim, a bolt passed through the felly, a nut engaging it, and a spring-clip comprising oppositely disposed members provided with registering openings through which the head of the nut is adapted to pass when it is in one of its positions, said head adapted to compress one portion of the clip relatively to the other and the compressed portion to then expand and bear against the nut.

5. The combination with a felly, a permanent rim, and a demountable rim, of a bolt engaging the felly, an element lying between said rims, a spring engaged therewith, said spring having an elongated opening, and a nut engaging said bolt and having an angularly arranged head adapted when in one position to pass through said opening and when in another position to rest and be borne against by said spring.

6. The combination with a felly, a permanent rim, and a demountable rim, of a bolt engaging the felly, a spring having an elongated opening, and a nut engaging said bolt and having an angularly arranged head adapted when in one position to pass through said opening and when in another position to rest and be borne against by said spring.

7. The combination with a felly, a permanent rim and a rim removable therefrom, of a bolt engaging the felly, an element adapted to exert pressure against the removable rim and provided with an elongated slot, and a nut engaging said bolt and having an angularly arranged head adapted when in one position for registration with and to pass through said slot and when in another position to hold the rim-bearing element in position.

8. The combination with a felly, a permanent rim and a detachable rim, of a bolt engaging the felly, a yielding element adapted to exert pressure against the demountable rim and provided with an elongated slot, and a nut engaging said bolt and having an angularly arranged head adapted when in one position to pass through said slot and when in another position to hold the yielding element in position.

9. The combination with a felly, a permanent rim and a detachable rim, of a bolt engaging the felly, a nut engaging the bolt, and means interposed between said rims and nut for maintaining the detachable rim in position on the permanent rim, said nut and interposed means so constructed relatively to each other that than when they are in fully locked positions a one-half rotation of the nut will disengage them.

10. The combination with a felly, a permanent rim, and a demountable rim; of a spring-clip having a rim-supporting extension and an elongated slot; a bolt passing through said felly and slot; and a nut having a cam-shaped head adapted to bear against and press said clip toward said rims when it is turned to one position, and to pass through said slot, whereby to remove all pressure of the clip on the rims, when it is in another position.

11. The combination with a felly, a permanent rim and a detachable rim, of a spring-clip one portion of which is normally divergent from the other, a bolt engaging the felly, and a nut on said bolt, said nut adapted to be given not to exceed a one-half rotation in order to bring the portions of the clip into juxtaposition whereby to lock said clip and thereby the detachable rim, and to be given not to exceed a one-half rotation in the opposite direction whereby to free said clip and detachable rim from engagement with each other.

In witness whereof we hereto affix our signatures, at Quincy, Adams county, Illinois, this 21st day of September, 1915.

GEORGE G. BAYNE.
ALFRED WM. KNUTSON.